United States Patent
Witkowski

(10) Patent No.: US 6,438,541 B1
(45) Date of Patent: Aug. 20, 2002

(54) METHOD AND ARTICLE FOR PROCESSING QUERIES THAT DEFINE OUTER JOINED VIEWS

(75) Inventor: Andrew Witkowski, Foster City, CA (US)

(73) Assignee: Oracle Corp., Redwood Shores, CA (US)

( * ) Notice: Subject to any disclaimer, the term of this patent is extended or adjusted under 35 U.S.C. 154(b) by 0 days.

(21) Appl. No.: 09/246,722

(22) Filed: Feb. 9, 1999

(51) Int. Cl.[7] .............................................. G06F 17/30
(52) U.S. Cl. ............................... 707/4; 707/3; 707/102; 707/2
(58) Field of Search .............................. 707/2, 3, 4, 102

(56) References Cited

U.S. PATENT DOCUMENTS

| | | | | |
|---|---|---|---|---|
| 5,418,943 A | * | 5/1995 | Borgida et al. ................ 707/4 |
| 5,504,885 A | * | 4/1996 | Alashqur ..................... 395/705 |
| 5,659,725 A | * | 8/1997 | Levy et al. ..................... 707/3 |
| 5,797,136 A | * | 8/1998 | Boyer et al. ................... 707/2 |
| 5,991,754 A | * | 11/1999 | Raitto et al. ................... 707/2 |
| 6,078,926 A | * | 6/2000 | Jensen et al. ............... 707/103 |
| 6,134,540 A | * | 10/2000 | Carey et al. ................... 707/2 |
| 6,134,543 A | * | 10/2000 | Witkowski et al. ............ 707/2 |

* cited by examiner

*Primary Examiner*—Jean R. Homere
(74) *Attorney, Agent, or Firm*—Ditthavong & Carlson, P.C.

(57) ABSTRACT

A query containing an outer join of a view based on a join of two tables is transformed by pushing one or more predicates of the outer join into the view. The pushed predicates provide new access paths and join methods that are used by a database server in generating an access plan to evaluate the view. In one embodiment, costs for processing the original and transformed queries are estimated and the lower cost query is processed.

22 Claims, 5 Drawing Sheets

METHOD AND ARTICLE FOR PROCESSING QUERIES THAT DEFINE OUTER JOINED VIEWS

FIELD OF THE INVENTION

The present invention relates to computer database systems and more particularly to processing queries that define an outer join operation on a view, where the view is produced by joining two database objects.

BACKGROUND OF THE INVENTION

Relational databases store information in collections of tables, in which each table is organized into rows and columns. FIG. 4(a) illustrates an exemplary database containing two tables, a department table "DEPT" 400 and a employee table "EMP" 410, useful for recording and organizing information about a company. The columns of the department table 400 hold attributes for the different departments of the company, including a department number "DEPTNO" 402, a department name "DNAME" 404, and a location "LOCATION" 406. Each department is stored in a row. For example, row 408 is an entry for department 11, which is an accounting department and located in Washington, D.C. The employee table 410 holds information in columns for each employee in the company. Such information may include, for example, an employee's name "ENAME" 412, job title "JOBNAME" 414, and department "DEPTNO" 416.

A database user retrieves information from the tables of a relational database by entering input that is converted to queries by a database application, which submits the queries to a database server. In response to receiving a query, the database server accesses the tables specified in the query to determine which information within the tables satisfies the query. The information that satisfies the queries is then retrieved by the database server and transmitted to the database application and ultimately presented to the user. Database servers are also capable of combining or "aggregating" information contained in the tables in response to a query. For example, one query for the exemplary database is to list all the departments in Washington, D.C., and the departments' employees, if any, with their job titles.

For any given database application, the queries must conform to the rules of a particular query language. Most query languages provide users with a variety of ways to specify information to be retrieved. For example, in the Structured Query Language (SQL), the following query in the ANSI SQL syntax requests the retrieval all the departments in Washington, D.C., and the departments' employees, if any, with their job titles:

[QUERY 1]

select DNAME, ENAME, JOBNAME from DEPT left outer join EMP on    DEPT.DEPTNO=EMP.DEPTNO   and DEPT.LOCATION='DC';

This query performs an "outer join" operation on the department table 400 and the employee table 402. An outer join is a species of a "join" operation that combines rows from two or more relational database objects, such as tables, views, or snapshots. A join is performed whenever multiple tables appear in the FROM clause of query. The SELECT list of the query can reference any of the columns from any of the base objects listed in the FROM clause.

Most join queries contain a WHERE or ON clause that contains a predicate that compares two columns, each from a different joined object. Such predicates are referred to join conditions. In addition to the join conditions, the WHERE or ON clause can also contain other conditions that refer to columns of only one of the joined objects for further restricting the rows returned by the join operation. To process a join, a database server combines pairs of rows that satisfy the join conditions and the other predicates. Rows that combine in a manner that satisfy the join conditions and other predicates are referred to herein as combining rows.

For an "inner join," only rows formed by combining rows are reflected in the result. In contrast, an outer join returns all combining rows plus all rows from one of the joined objects for which no rows from the other joined object satisfy the join conditions (i.e. the non-combining rows). A "left outer join" is a outer join in which the noncombining rows from the left listed object in the FROM clause are brought into the result; a "right outer join" is an outer join in which the non-combining rows from the right listed object in the FROM clause are brought into the result; and a "full outer join" is an outer join in which the non-combining rows from both the right and left listed objects in the FROM clause are brought into the result.

As illustrated in FIG. 4(b), the results 420 of processing QUERY 1 includes one or more rows for each of the departments in Washington, D.C. As in any join operation, the outer join results include the rows that satisfy the join condition of correlated department numbers (rows 424 and 426). For the left outer join operation, another row 422 of the results 420 is derived from the left object, department table 400, because there is no corresponding row in the employee table 410 that matches the join condition for row 408 of the department table 400.

Techniques exist for efficiently processing an outer join on two tables. For example, a database server may recognize that the employee table 410 has an index built on the "DEPTNO" column 416. A database index is conceptually similar to a normal index found at the end of a book, in that both kinds of indexes comprise an ordered list of information accompanied with the location of the information. Specifically, a database index contains ordered values from one or more columns of a table and a list of which rows in the table contain those values. Indexes can provide performance benefits over full table scans if the predicates are selective, because the index renders it no longer necessary to scan the entire table to find the rows that contain particular column values.

The performance benefits of an index are particularly apparent when a predicate in the WHERE clause of QUERY 1 causes only a few rows to be selected from the employee table 410. In the example, a WHERE predicate specifying that the location is 'DC' is selective, because it causes only the department numbers of 11 and 31 to be looked up in the employee table 410. On the other hand, if the predicates are nonselective, full table scans are preferred over index scans because full table scan can exploit the efficiencies of block input/output operations to read data from the table.

Over time, it is not uncommon for database administrator to reorganize their tables as conditions warrant. For example, after the employee table 410 was created, which explicitly included the job title in column "JOB" 414, a database administrator may desire to reorganize the employee table 410. Referring to FIG. 6(c), the database administrator may wish to create a new job table 440 to list the job title "JOBNAME" 444 and pay grade "PAYGRADE" 446 of each job in the company. Jobs in the job table 440 are identified by a job number "JOBNO" 442. The employee table 410 is modified to produce a new employee table 430 that includes employee name "ENAME" 432 and department number "DEPTNO" 436 columns as before, but with job number "JOBNO" column 434 as foreign key value to reference the appropriate entry in job table 440. Creation of the job table 440 is useful for pooling all the appropriate information about the company's job into a database object, without denornalization of the other tables.

An upward compatibility issue with this proposed database reorganization is that there may be many queries for many database applications that still reference the "JOB-NAME" column 414, that was moved into the new job table 440. For some database environments, updating all the queries may require many staff-years to complete. Accordingly, database administrators prefer to create a "view" that looks to the database applications like the old employee table 420 but is really formed as a join of the new employee table 430 and the new job table 440.

A view is a logical table, and as logical tables, views can be queried just as if they were tables. The data that views actually present, however, is extracted or derived from other database objects, which may in fact be tables, other views, or snapshots. A view is defined by metadata referred to as a view definition, which is typically in the form of a database query. For example, a view definition to create a view "EMP" that looks like the old employee table "EMP" 420 and based on the new employee table "EMP" 430 and the new job table "JOB" 440 may be issued as follows:

[QUERY 2]
    create view EMP as
    select ENAME, JOBNAME, DEPTNO
    from NEWEMP, JOB
    where NEWEMP.JOBNO=JOB.JOBNO;

Since QUERY 2 defines a view "EMP", QUERY 1 is said to contain an "outer joined view" because QUERY 1 contains a view "EMP" that is subjected to an outer join operation. In QUERY 2, the exemplary view is a join of two tables, although the view may conceivably join other database objects, such as other views or snapshots.

A disadvantage with outer joined views is that conventional database servers inefficiently process outer joined views. Since the outer join operation is not commutative, the database server cannot freely re-order the joins and. outer join during join planning. This restriction may limit the database server from finding an efficient join plan. For example, in QUERY 1 used with the view of QUERY 2, the database server cannot first outer join the NEWEMP table 430 to the DEPT table 400 and then inner join the result to the JOB table 440, because the result is not semantically equivalent. In the example, the inner join, which was performed second, causes row 422 of the correct result to be dropped, because a null row from the NEWEMP table 430 does not satisfy the inner join conditions.

Thus, conventional database servers evaluate the view first, i.e., inner join the NEWEMP table 430 and the JOB table 440. When the join conditions of the view are non-selective, as typical in this example, evaluating the view first causes a full table scan of both tables. In contrast with the original outer join on tables, the condition in the outer join (e.g. LOCATION='DC') does not reduce a portion of the NEWEMP table 430 that participates in the overall query, and any index on the DEPTNO column 436 of the NEW-EMP table 430 cannot be used during or after the view evaluation. This access path is clearly less efficient than the original outer join query. When the view is very large, this access path is significantly less efficient.

SUMMARY OF THE INVENTION

Accordingly, there is a need for efficiently processing queries with outer joined views. A need also exists for a processing outer join queries on a view that allows index scans to be performed when more efficient than performing full table scans. These and other needs are addressed by a query transformation that pushes an outer join predicate into the view. When evaluating the view, the pushed outer join predicate can be considered during join planning and, if sufficiently selective, be used to reduce the portion of the tables joined in the view for scanning and avoid a full table scan.

One aspect of the invention is a computer-implemented method and computer-readable medium bearing instructions for processing a query in a database system. The methodology includes receiving an original query that contains an outer join operation of a view formed of a database object; transforming the original query into a transformed query by transferring a predicate for the outer join operation into the view; and then processing the transformed query.

Preferably, costs of the query before and after the query transformation are estimated to determine whether the transformation was appropriate for a particular query. Accordingly, another aspect of the invention is a computer-implemented method and computer-readable medium bearing instructions for processing a query in a database system. The methodology includes receiving an original query that contains an outer join operation of a view, where the view is formed of a join of a database object. A first cost for processing the original query is estimated. The original query is transformed into a transformed query by transferring a predicate for the outer join operation into the join for the view. A second cost estimate is made for processing the transformed query. The first and second costs are compared. If the first cost is less than the second cost, then the original query is processed; but if the second cost is less than the first cost, then the transformed query is processed.

Still other needs addressed and advantages attained by the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4(*b*) depicts exemplary results from an outer join query.

FIG. 4(*c*) depicts base tables of an exemplary view.

DESCRIPTION OF THE PREFERRED EMBODIMENT

A method and apparatus for processing queries is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In a database management system, data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects. and the fields are referred to as attributes. Other database architectures may use other terminology.

Systems that implement the present invention are not limited to any particular type of data container or database architecture. However, for the purpose of explanation, the terminology and examples used herein shall be that typically associated with relational databases. Thus, the terms "table," "row," and "column" shall be used herein to refer respectively to the data container, record, and field.

Hardware Overview

Figure 1:
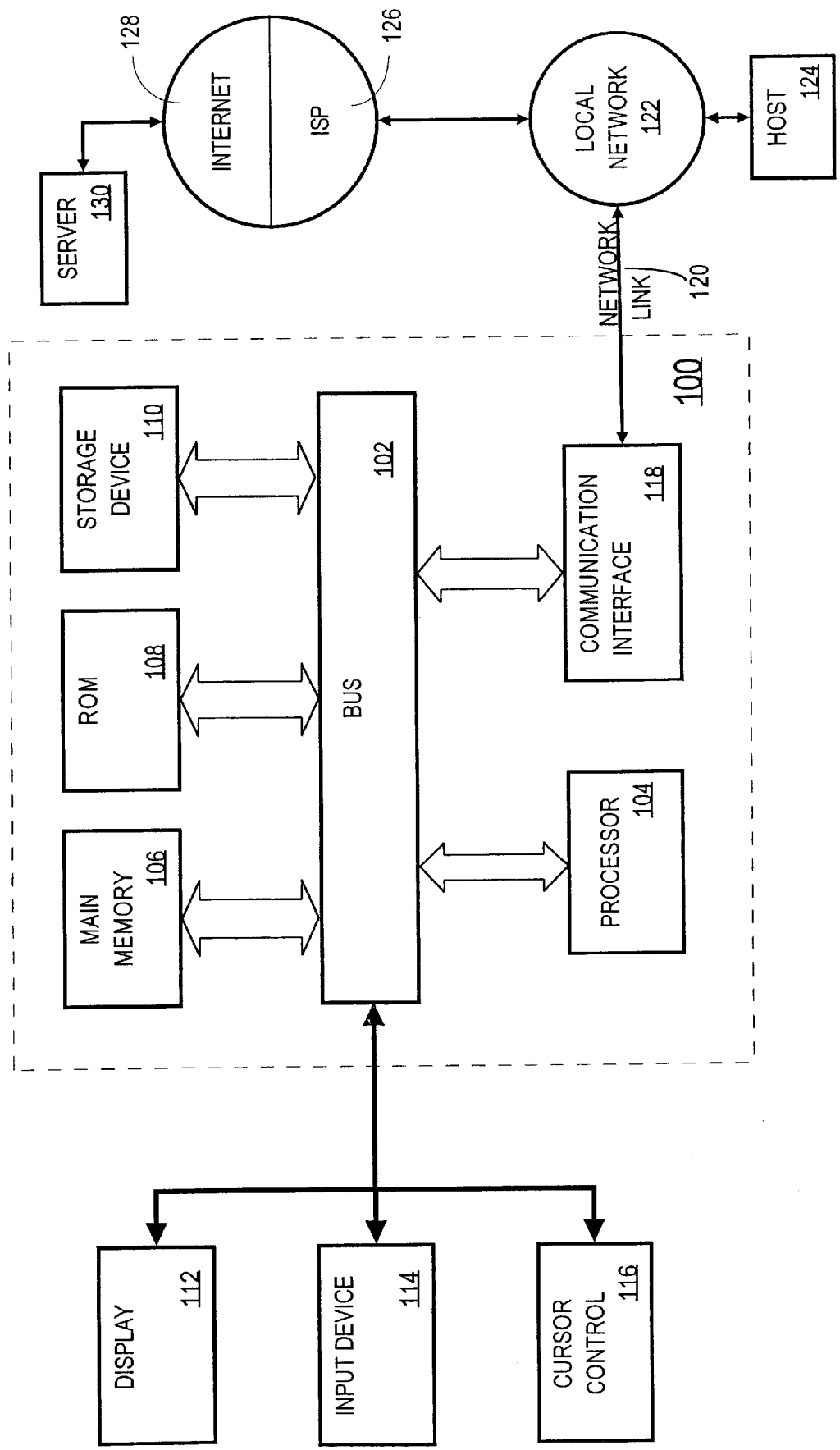
FIG. 1 depicts a computer system that can be used to implement the present invention.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic tape drive, a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device-typically has two degrees of freedom in two axes, a first axis (e.g., x) and a second axis (e.g., y), that allows the device to specify positions in a plane.

The invention is related to the use of computer system 100 for efficiently retrieving values from an index. According to one embodiment of the invention, efficiently retrieving values from an index is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP)

126. ISP 126 in turn provides data communication services through a worldwide packet data communication network 128, such as the "Internet." Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for efficiently retrieving values from an index as described herein.

The received code may be executed by processor 104 as it is received, and/or stored in storage device 110, or other non-volatile storage for later execution. In this manner, computer system 100 may obtain application code in the form of a carrier wave.

Query Transformations

Techniques are described herein for transforming an original query into a semantically equivalent transformed query by pushing an outer join predicate into the view. The transformed query produced by the pushing the outer join predicate in the view, in some circumstances, can be processed more efficiently than the original query. A transformed query is said to be semantically equivalent to an original query if processing the transformed query results in retrieving the same information as processing the original query.

Figure 2:
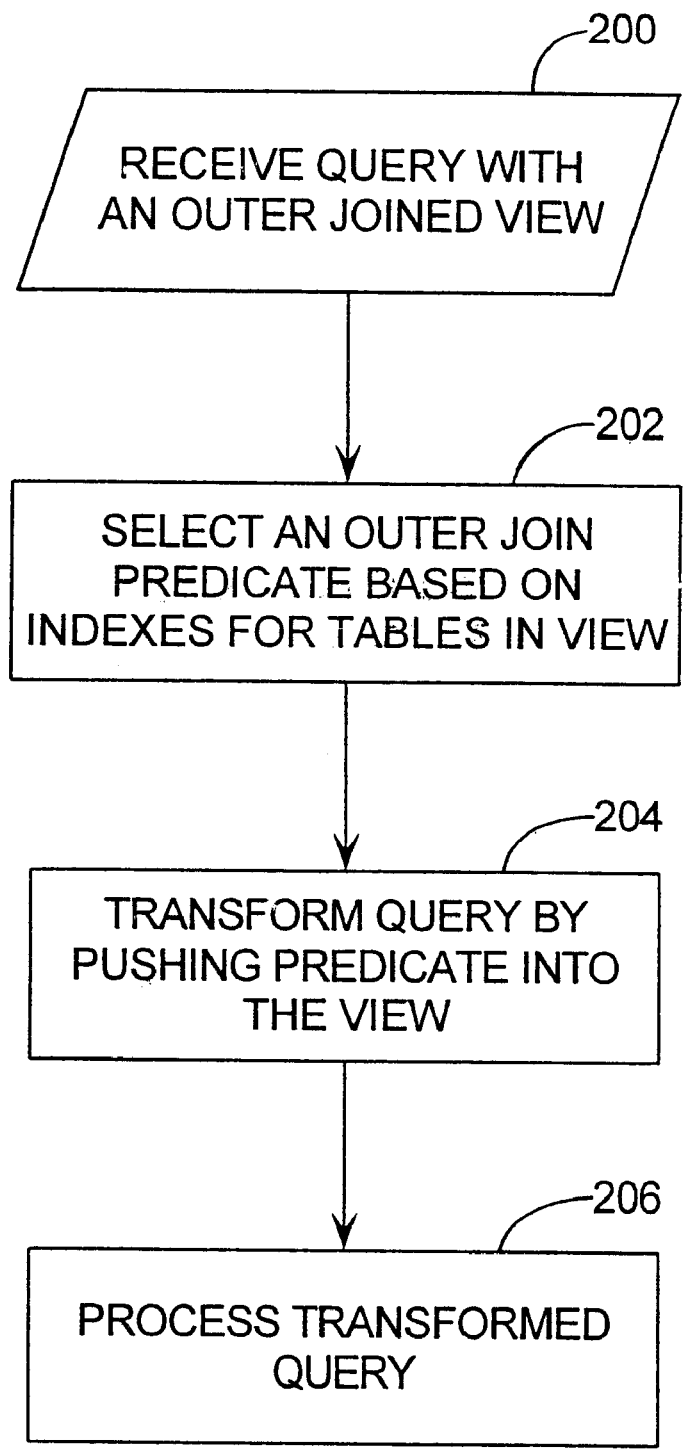
FIG. 2 is a flowchart illustrating the operation of processing queries having-an outer joined view according to one embodiment.

Referring to FIG. 2, the original query containing an outer joined view is received by a database server (step 200). This query can be submitted to a database server from user input, a stored procedure, and the like. For purpose of a working example, operation of one embodiment is illustrated using QUERY 3, based on QUERY 1 and QUERY 2 wherein the view definition is embedded in the query that references the view:

[QUERY 3]
   select DNAME, ENAME
   from DEPT left outer join
     (select ENAME, JOBNAME as JOB, DEPTNO
     from NEWEMP, JOB
     where NEWEMP.JOBNO=JOB.JOBNO) EMP
   on DEPT.DEPTNO=EMP.DEPTNO and DEPT.LOCATION 'DC';

At step 202, an outer join predicate is selected, preferably based on indexes built upon tables in view. An outer join predicate is a condition in the ON clause or WHERE clause. While the method for selecting which predicate or predicates will vary from implementation to implementation, those predicates which reference indexed columns on a view table are selected in accordance with one embodiment because sufficiently selective index scans are more efficient than a full table scan. For example, if an index was built upon the department number column "DEPTNO" 436 of the new employee table "NEWEMP", then predicate "DEPT.DEPTNO=EMP.DEPTNO" is a candidate. On the other hand, the predicate "DEPT.LOCATION='DC'" is not a good candidate for selection because it does not reference any column in a view table.

For some queries, there may in fact be many available indexes and, hence, many available predicates in the WHERE clause or ON clause that reference indexed columns of view tables. According to one embodiment, the most beneficial predicates are chosen based on the selectivity of the predicates. This evaluation can be performed by modifying routines that determine an access plan for a simple outer join (i.e. with no views) to treat the view as a table and treat the indexes of the view table columns as indexes for the view columns. The routines may estimate the selectively, for example, by keeping statistics of table values in a histogram. By "promoting" indexes of the base tables of a view, code for determining an access plan for a simple outer join can be reused to work with outer joined views. In accordance with a less discriminating embodiment, all qualifying predicates are selected.

At step 204, the received query is transformed into a semantically equivalent query by pushing the selected predicate or predicates into the view. In the working example, if the predicate "DEPT.DEPTNO=EMP.DEPTNO" was selected, then that predicate would be pushed into the view. Pushing into the view refers to incorporating the predicate into a WHERE clause or ON clause of the view defining query. If the predicate explicitly refers to a column of the view, then that column reference is updated to refer to the appropriate column of a base table that contributes that column to the view. After the selected outer join predicate is pushed into the view, the outer join predicate is preferably removed from the outer join WHERE clause or ON clause as redundant. In the working example, QUERY 4 illustrates a result of pushing the predicate "DEPT.DEPTNO=EMP.DEPTNO" into the view, wherein the reference to "EMP.DEPTNO" is resolved into "NEWEMP.DEPTNO":

[QUERY 4]
   select DNAME, ENAME
   from DEPT left outer join
     (select ENAME, JOBNAME, DEPTNO
     from NEWEMP, JOB
     where NEWEMP.JOBNO JOB.JOBNO
      and DEPT.DEPTNO=NEWEMP.DEPTNO) EMP
   on DEPT.LOCATION='DC';

At step 206, the transformed query is processed to return the requested results to the issuer of the query. Pushing an outer join predicate into the view provides a new access path in the view for determining an access plan for evaluating the view. In the working example, the pushed predicate "DEPT.DEPTNO=NEWEMP.DEPTNO" in conjunction with an index on the "DEPTNO" column 436 of the "NEWEMP" table 430 can be used to restrict the "NEWEMP" table 430 before joining with the "JOB" table 440. Thus, it is not necessary to evaluate a join of the entire "NEWEMP" table 430 and "JOB" table 440 inside the view.

Consequently, the access plan with a pushed predicate can be more efficient because the full table scans of view tables are replaced by indexed accesses to the view tables. In the working example, the outer join predicate "DEPT.LOCATION='DC'" is selective, choosing only department numbers 11 and 31 from the "DEPT" table 400. Accordingly, a full table scan of the "NEWEMP" table 430 is avoided in favor of two indexed accesses into an index built on the "DEPTNO" column 436 of the "NEWEMP" table 430, yielding a "(null)" for the first probe of the index and the job numbers 41 and 50 for the second probe of the index. If there is also an index on the "JOBNO" column 442 of the "JOB" table 440, which is likely if the "JOBNO" column 442 is a primary key column, then a fill table scan of the "JOB" table 440 can also be avoided in favor of a small number of indexed accesses, in this example, for job numbers 41 and 50. In this example, two full table scans are advantageously replaced by two faster indexed access, although it is evident that some benefit is attained even if only one of the full tables scans was replaced by a faster indexed access.

Cost-Based Outer Joined View Transformation

The cost for performing a full table scan is dependent on the size of the table, i.e. accessing all the rows of the table, and secondary storage block I/O operations. The cost for performing an index scan (accessing a table through an index) is dependent on the number of rows actually returned, plus some overhead in accessing the index. As a result, the performance benefits in replacing a full table scan with an index scan will vary from table to table, and may even in fact be negative. Accordingly, it is desirable to process the semantically equivalent transformed query only when the transformed query can be more efficiently processed than the original query.

Figure 3:
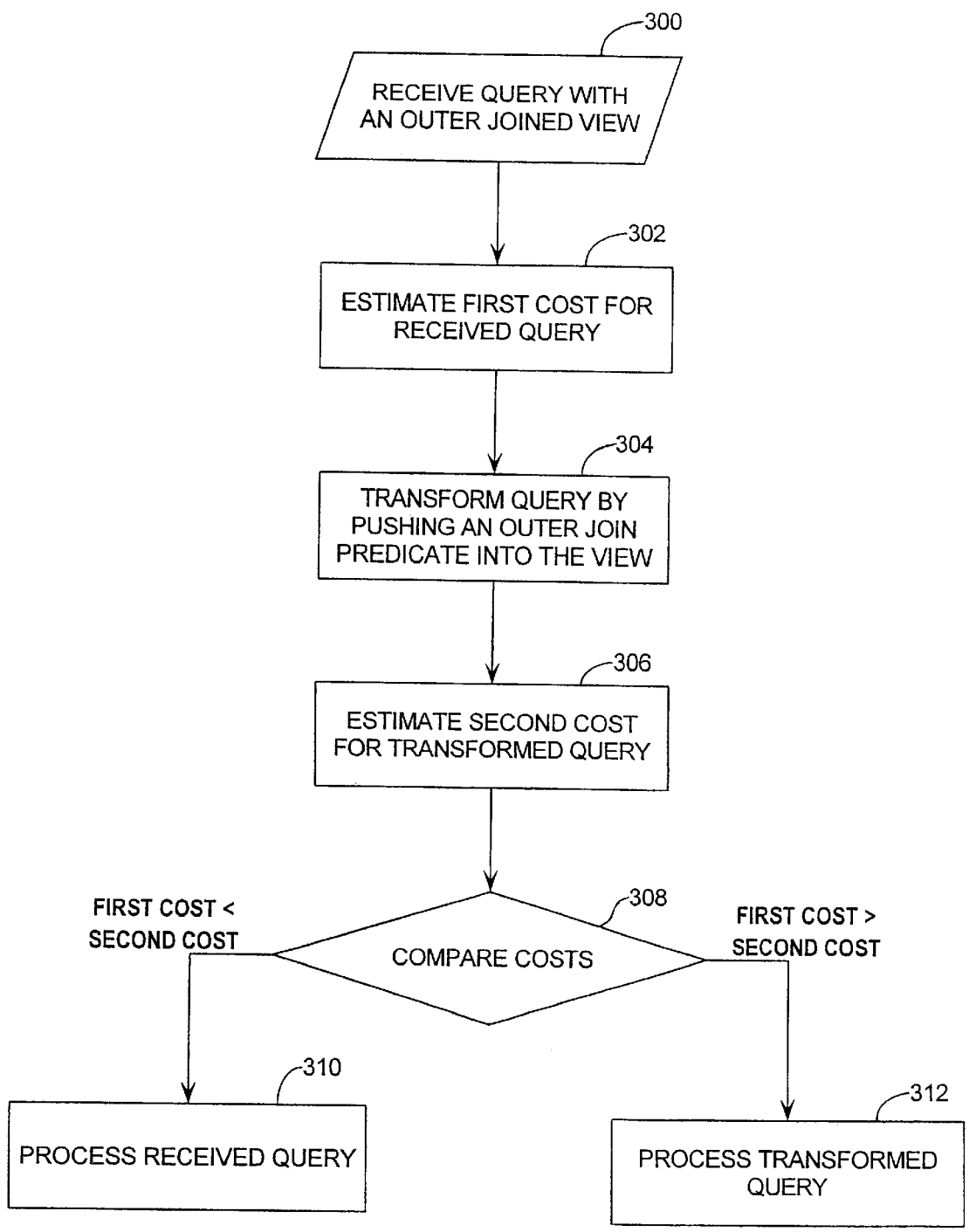
FIG. 3 is flowchart illustrating the operation of processing queries having an outer joined view according to another embodiment.
Figures 4A, 4B:
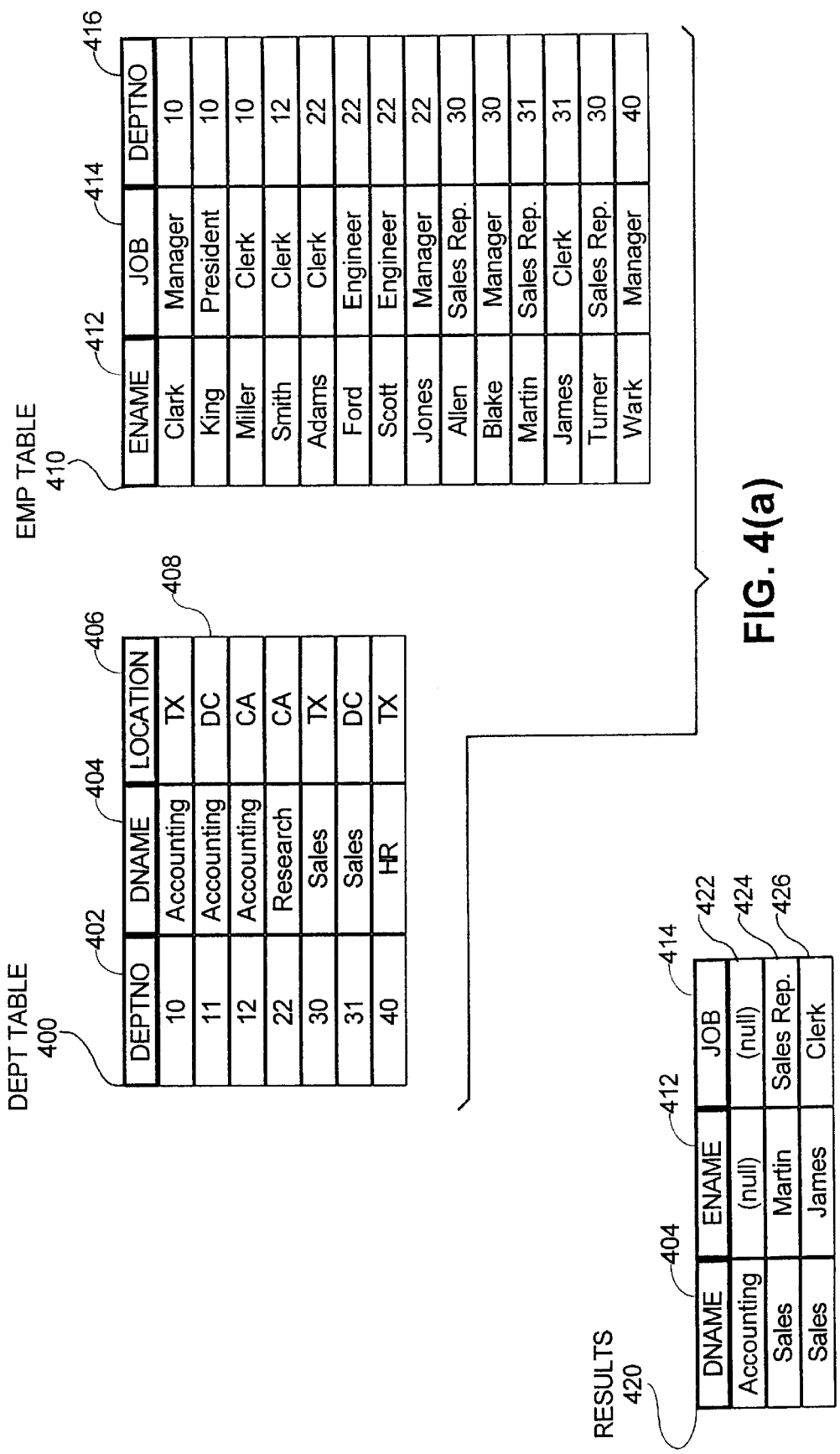
FIG. 4(*a*) depicts an exemplary database.
Figure 4C:
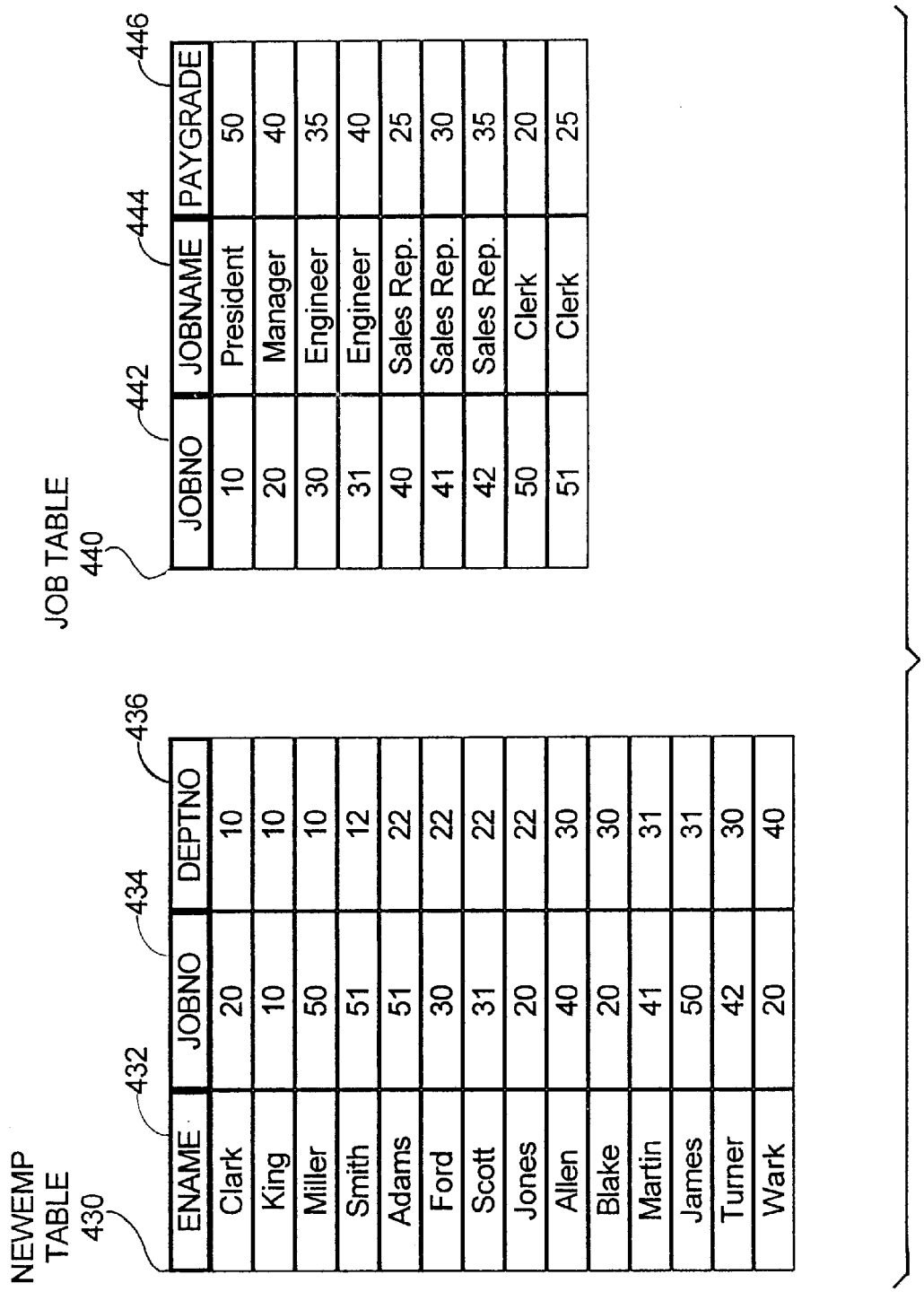

In accordance with one embodiment, a cost is computed for executing the original query and for executing the transformed query, and the query with the lower cost is executed. Various cost metrics, such as estimating the amount of disk I/O used in executing the query, may be employed, and the present invention is not limited to the use of any particular cost metric. Referring to FIG. 3, the original query with an outer joined view is received (step 300). A cost for the processing the original query is estimated, based on such factors as the amount of input and output from secondary storage (step 302). For example, the cost estimation may take into account the number of disk blocks that need to be read in for a full table scan divided by a factor to account for multi-block input and output benefits for sequential access.

At step 304, the original query is transformed as described supra, by pushing appropriate predicates into the view. A cost for the processing the transformed query is estimated, based on such factors as the amount of input and output from secondary storage (step 306). For example, the cost estimation may take into account the number of disk blocks that need to be read in for accessing the index and then the table. Conservatively, any benefits of sequential access for multi-block input and output need not be taken into account since sequential access is unlike in an index scan.

At step 308, the estimated cost for processing the original query and the estimated cost for processing the transformed query are compared. If the estimated cost for processing the original query is less than the estimated cost for processing the transformed query, then the original query should be performed (step 310). On the other hand, if the estimated cost for processing the transformed query is less than the estimated cost for processing the original query, then the transformed query should be performed (step 312). If the estimated costs are the same, then either query may be processed.

By pushing an outer join predicate into a view, the database server has more options in terms of new access paths and new join methods in determining an access plan for evaluating the view. In particular, the pushed outer join predicate can restrict one of the view tables sufficiently as to allow a more efficient access path (indexed versus full table scan) to be adopted. As a result, queries involving outer joined views can be processed more efficiently, thereby reducing query response time. Preferably, costs for the original and transformed queries are estimated in order to process the better performing query.

While this invention has been described in connection with what is presently considered to be the most practical and preferred embodiment, it is to be understood that the invention is not limited to the disclosed embodiment on the "DEPTNO" column 436 of the "NEWEMP" table 430, but on the contrary, is intended to cover various modifications and equivalent arrangements included within the spirit and scope of the appended claims.

What is claimed is:

1. A method of processing a query in a database system, comprising the computer implemented steps of:

receiving an original query that contains an outer join operation of a view formed of a database object;

transforming the original query into a transformed query by incorporating a predicate of the outer join operation into the view; and processing the transformed query.

2. The method of claim 1, wherein the transformed query is semantically equivalent to the original query.

3. The method of claim 1, wherein:

the view contains a join on the database object; and the step of incorporating the predicate includes the step of incorporating the predicate for the outer join operation into the join on the database object.

4. The method of claim 3, wherein the step of transforming further includes the step of identifying the predicate from among one or more predicates for the outer join operation based on an index built upon the database object.

5. The method of claim 4, wherein the identified predicate references a column of the database object upon which column the index was built.

6. A method of processing a query in a database system, comprising the computer implemented steps of:

receiving an original query that contains an outer join operation of a view formed of a join of a database object;

estimating a first cost for processing the original query;

transforming the original query into a transformed query by incorporating a predicate for the outer join operation into the join for the view;

estimating a second cost for processing the transformed query;

comparing the first cost and the second cost;

if the first cost is less than the second cost, then processing the original query; and if the second cost is less than the first cost, then processing the transformed query.

7. The method of claim 6, wherein the transformed query is semantically equivalent to the original query.

8. The method of claim 6, wherein the step of transforming includes the step of identifying the predicate from among one or more predicates for the outer join operation based on an index built upon the database object.

9. The method of claim 8, wherein the identified predicate references a column of the database object upon which column the index was built.

10. A computer-readable medium bearing instructions for processing a query in a database system, said instructions arranged, when executed by one or more processors, to cause the one or more processors to perform the steps of:

receiving an original query that contains an outer join operation of a view formed of a database object;

transforming the original query into a transformed query by incorporating a predicate of the outer join operation into the view; and processing the transformed query.

11. The computer-readable medium of claim 10, wherein the transformed query is semantically equivalent to the original query.

12. The computer-readable medium of claim 10, wherein:
the view contains a join on the database object; and
the step of incorporating the predicate includes the step of incorporating the predicate for the outer join operation into the join on the database object.

13. The computer-readable medium of claim 12, wherein the step of transforming further includes the step of identifying the predicate from among one or more predicates for the outer join operation based on an index built upon the database object.

14. The computer-readable medium of claim 13, wherein the identified predicate references a column of the database object upon which column the index was built.

15. A computer-readable medium bearing instructions for processing a query in a database system, said instructions arranged, when executed by one or more processors, to cause the one or more processors to perform the steps of:
receiving an original query that contains an outer join operation of a view formed of a join of a database object;
estimating a first cost for processing the original query;
transforming the original query into a transformed query by incorporating a predicate, for the outer join operation into the join for the view;
estimating a second cost for processing the transformed query;
comparing the first cost and the second cost;
if the first cost is less than the second cost, then processing the original query; and
if the second cost is less than the first cost, then processing the transformed query.

16. The computer-readable medium of claim 15, wherein the transformed query is semantically equivalent to the original query.

17. The computer-readable medium of claim 15, wherein the step of transforming includes the step of identifying the predicate from among one or more predicates for the outer join operation based on an index built upon the database object.

18. The computer-readable medium of claim 17, wherein the identified predicate references a column of the database object upon which column the index was built.

19. The method of claim 1, further comprising the step of transforming the original query into the transformed query by removing the predicate incorporated into the view from the outer join operation.

20. The method of claim 6, further comprising the step of transforming the original query into the transformed query by removing the predicate incorporated into the view from the outer join operation.

21. The computer-readable medium of claim 10, wherein the instructions are further arranged for causing the one or more processors to perform the step of transforming the original query into the transformed query by removing the predicate incorporated into the view from the outer join operation.

22. The method of claim 5, wherein the instructions are further arranged for causing the one or more processors to perform the step of transforming the original query into the transformed query by removing the predicate incorporated into the view from the outer join operation.

* * * * *